May 10, 1932. G. KOEHLER, JR., ET AL 1,857,917
AIR PRESSURE REGULATOR
Filed June 22, 1929
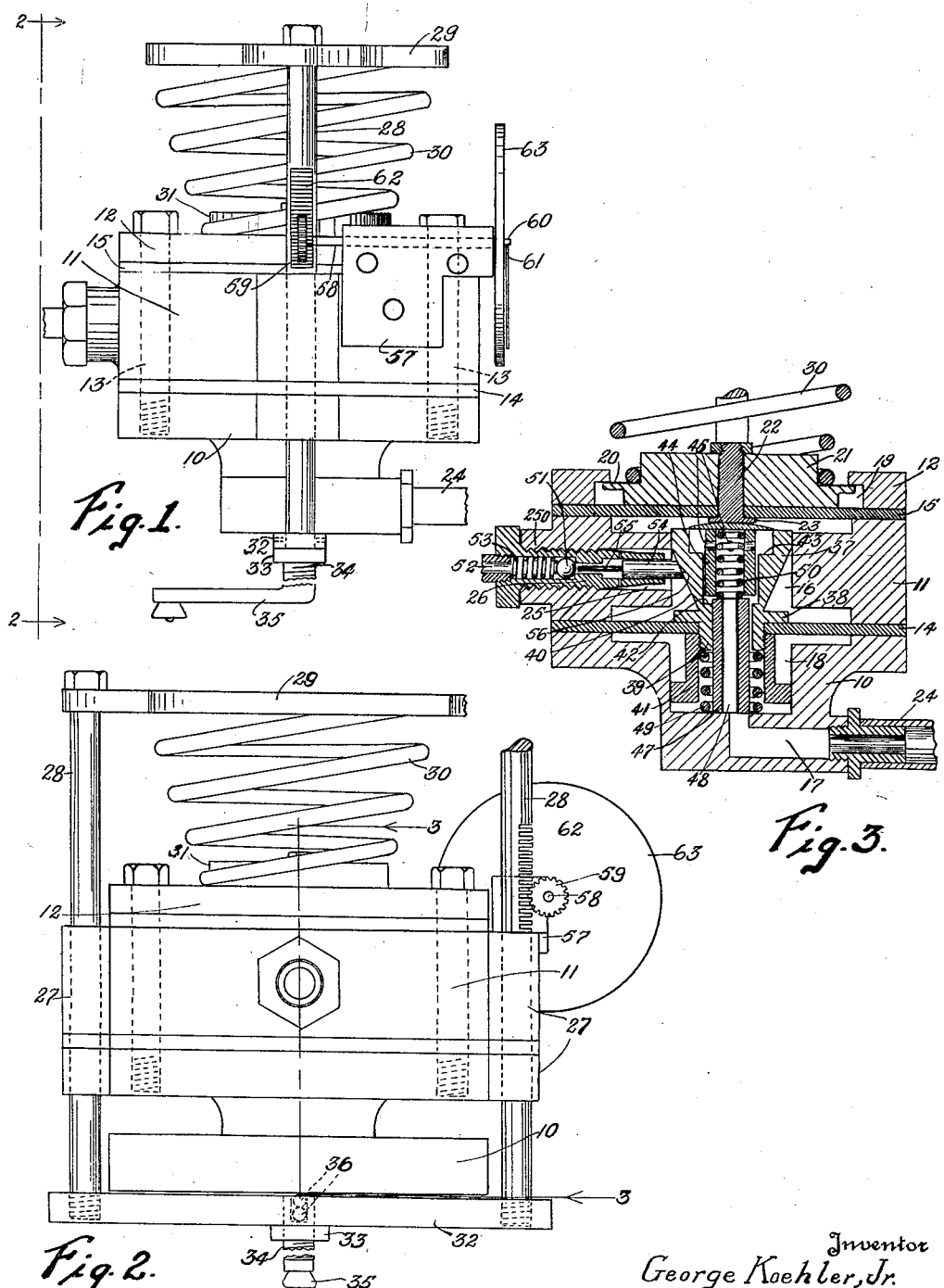
Inventor
George Koehler, Jr.
Walter P. Hill Patented May 10, 1932

1,857,917

UNITED STATES PATENT OFFICE

GEORGE KOEHLER, JR., AND WALTER P. HILL, OF CINCINNATI, OHIO, ASSIGNORS TO KELLOGG MANUFACTURING COMPANY, INC., OF ROCHESTER, NEW YORK, A CORPORATION OF NEW YORK

AIR PRESSURE REGULATOR

Application filed June 22, 1929. Serial No. 372,991.

This invention relates to a pressure regulator and especially to a device for inflating automobile tires to a predetermined pressure from a source of air pressure supply.

An object of the invention is to provide a small compact device with a minimum of moving parts.

Another object is to provide a device which is especially simple in manufacture and assembly and which is effective in operation.

Another object is to provide a simple and efficient pressure setting and adjustment means upon which the device is mounted.

Another object is to provide a device which effects rapid pulsations at a substantially uniform rate throughout its operation of inflating a tire or other receiver.

Another object is to provide a device of this kind wherein no loss of pressure is possible during operative or inoperative conditions of the device.

These and other objects are attained by the means described herein and disclosed in the accompanying drawings in which:

Fig. 1 is a side elevational view of a device of the invention.

Fig. 2 is a rear elevational view of the device shown in Fig. 1, part being broken away.

Fig. 3 is a view taken on line 3—3 of Fig. 2.

Devices have heretofore been provided for inflating automobile tires and other containers to predetermined pressures from a source of fluid under pressure such as an air compressor. Many of said devices have been open to various objections and disadvantages among which are relatively sensitive structures which require frequent inspection and adjustment and cleaning, relatively slow operation, and substantial non-uniformity of operation during the filling of a tire. The herein described invention avoids these and other difficulties experienced with air pressure regulators in common use and further renders the cost of manufacture, installation and maintenance of devices of this kind quite small.

The device consists essentially of a small closed housing formed of castings with a minimum of machining. The structure furthermore requires no close machining to exact dimensions as would be normally expected in devices of this character. For this reason there is little if any appreciable wear on the parts after long and abusive use of the device and adjustments are practically unnecessary.

As shown herein the device comprises a casing conveniently made up of castings and consisting of a bottom 10 a central member 11 and a top member 12 secured together by a plurality of cap screws or bolts 13. Between the members 10 and 11, and 11 and 12 are secured diaphragms 14 and 15 of flexible impervious material such as rubber or rubber composition. The casing member 10 has a cylindrical bore 18 and an outlet opening 17 communicating therewith. The member 11 has a cylindrical bore 16 extending entirely through it and of substantially uniform size with the bore 18 in member 10. The adjacent faces of these two members have enlarged counterbores to permit of a limited flexing of the diaphragm 14 therebetween. The top member 12 has an interiorly undercut bore 19 and a flange 20 for receiving and limiting the movement of an adjusting disc 21. The adjusting disc 21 carries a suitably restricted stud 22 and an enlarged head 23, the stud 22 extending through diaphragm 15 which is held in close association with disc 21 by the head or button 23. The outlet opening 17 has suitable means for receiving a tire inflation hose 24 to which may be secured the usual tire filling chuck (not shown). A straight radial bore 25 extends through the center casing member 11 and is interiorly threaded at its outer end 250 to receive a tubular inlet valve member 26 which is connected with any suitable pipe or tube in constant communication with a suitable source of air pressure supply such as an air compressor (not shown). Suitable bored bosses 27 on opposite sides of the housing or casing member provide sliding bearings for a pair of rods 28. Between the top of rods 28 is mounted a plate 29. A pressure spring 30 has its opposite ends in abutment with plate 29 and the outer face 31 of disc 21. A cross head 32 with a central threaded boss 33 has the remaining ends of rods 28 secured thereto. Into the threaded boss 33 is screwed a suitable threaded stud 34 provided with any type of manipulating handle such as a crank 35. The end of threaded stud 34 is counter-bored to receive a simple antifriction device which in this embodiment comprises a pair of steel balls 36, one of which protrudes slightly from the stud and abuts the outer exposed face of bottom member 10.

From the foregoing it will be noted that rotation of the stud 34 will force the casing away from cross head 32 and effecting a compression of pressure adjusting spring 30 upon disc 21 and diaphragm 15 associated therewith. In the cylindrical chamber comprising the bores 16 and 18 is disposed the reciprocating supply valve control device. This consists essentially of a two-part tubular piston extending through and fixed on the diaphragm 14. The upper portion 37 of the piston has a flange 38 abutting the top of diaphragm 14 and a depending exteriorly threaded extension 39 passing through the diaphragm. Above the flange 38 the member 37 has a tapered outer wall 40. The lower portion 41 of the piston is screw threaded onto the extension 39 and the end thereof cooperates with the flange 38 for fixing the piston to the diaphragm. The member 37 has a bore therethrough enlarging at two places to provide shoulders 42 and 43. The bore between shoulders 42 and 43 receives and guides a sleevelike portion 44 having radial holes therethrough to effect communication between the interior of sleeve 44 and the annular space surrounding it above shoulder 43. A poppet valve head is provided on top of sleeve 44 and this seats upon the top face of member 37 and effects a seal of the bore therein. Seated against the bottom of the chamber 18 in member 10 is a tubular pin 47 having a bore 48 therethrough communicating with the outlet passage 17. Surrounding the tubular pin 47 is a spring 49 which rests upon the bottom wall of the chamber and abuts the end of the projection 39 to normally raise the piston to the position shown. The wall thickness of tubular pin 47 is such that at its top a spring 50 may be seated to extend within the hollow interior of sleeve 44 and abut the lower face of poppet valve head 46. The diameter of the bore in the sleeve 44 and the thickness of the wall of said sleeve are such that the top of tubular pin 47 may abut the bottom of sleeve 44 to compress spring 50. The valve 26 contains the usual ball check 51 which is normally held closed by the pressure from a source of supply entering at 52. The usual spring 53 insures perfect seating of ball check 51. A suitable shouldered bore in valve member 26 carries a reciprocating plunger 54 having a valve operating pin 55 which may unseat ball check 51. The end of plunger 54 is tapered at 56 complementally to the taper 40 on the piston so that when the piston is depressed against spring 49 the plunger 54 will recede into its bore and the pin 55 will open valve 51. It will be noted that the buttonlike member 23 seats directly upon the top of poppet valve head 46 and normally holds it upon its seat on top of piston 37. Thus a normally sealed chamber is provided between diaphragms 14 and 15 and around the piston and communication through the sleeve 44 is normally cut off by the seating of the poppet valve.

From the foregoing it will be apparent that the diaphragm 15 may be depressed by spring 30 and the pressure exerted thereon will flex diaphragm 15 and press head 23 against the poppet valve head 46 and thus depress the piston for starting a flow of air at compressor or tank pressure. As will be better understood from the description of the operation of the device indicating means are desirable for the accurate regulation of the amount of pressure to be exerted by spring 30. This means consists of a suitable bearing block 57 in which is journalled a shaft 58 having a gear 59 at one end and a pin 60 at the other end for receiving an indicator hand 61. Teeth 62 are cut on one side of one of the rods 28 for receiving the teeth of gear 59. Thus when the crank 35 is turned and the body of the housing has movement relative to the yoke comprising plate 29 cross head 32 and rods 28 the extent of such relative movement will be converted into rotary movement of the pin 60 and indicating hand 61. A suitably graduated dial 63 is mounted upon the end of bearing block 57.

The operation of the device is as follows: Normally a supply of air under pressure is connected with the device at 52 so that the ball check 51 is urged to a closed position. The usual tire filling air chuck (not shown) is mounted on the end of hose 24 and the valve in this chuck is closed under the air pressure within the device. Assuming that the crank 35 had been turned to compress spring 30 and the spring was exerting 50 pounds pressure upon disc 21 and diaphragm 15 connected therewith, the diaphragm would flex under this pressure and depress piston 37 by reason of the transmission of this pressure through 23 and the poppet valve head 46. If now, the air chuck on hose 24 were seated upon a tire valve stem and thus opened, communication would be established through outlet 17 to the interior of tubular stem 47 and that pressure would rush into the tire. Upon decreasing the pressure in the outlet 17 and outlet chamber 18 the entire piston would be depressed initially under the influence of spring 30 to unseat ball check 51 by the cooperation of faces 40 and 56 on the piston and plunger. At this time poppet valve 46 is still held on its seat by the head 23. Air at tank pressure (e. g. 200 pounds)

now rushes past ball check 51 and into chamber 16 around and above all parts of the piston therein. As the air pressure builds up it operates on the combined area of the poppet valve head and the exposed top head of piston 37 and begins to depress it against the resistance of spring 49. At the same time this pressure in inlet chamber 16 forces diaphragm 15 back against the pressure of spring 30. As the piston 37 continues to move down the check valve 51 is further opened and still greater pressure is built up in chamber 16. Piston 37 then continues to move down until the end of sleeve 44 of the poppet valve abuts the top of tubular pin 47 whereupon further movement of the piston causes the pin to unseat the poppet valve and break the air seal so that air will rush into the interior of piston 37 at the top, thence through perforations 45 and through the tubular passages in the sleeve and in the tubular pin, thence through the outlet 17, hose 24 and through the air chuck into the tire. It is to be understood that the amount of movement of the piston and the various parts just described is very small and that several movements take place very rapidly. When the seal of the poppet valve is broken, spring 50 which has been under compression is now free to lift the poppet valve. Thus unrestricted flow of air is established momentarily from check valve 51 to chamber 16 thence through the bores in piston 37 through the outlet. The pressure which is thus quickly built up in hose 24 now also builds up in outlet chamber 18 and, with the assistance of spring 49 quickly raises the entire piston so that the poppet valve is removed from the positive influence of the tubular pin 47 and the spring 50 is overcome so that poppet valve 46 again is seated by abutment with the head 23 below the diaphragm 15. Thus all communication is again cut off between the chamber 16 and outlet chamber 18 and the plunger 54 has been again allowed to project into the device by the receding inclined face 40 whereupon the ball check 51 may seat and shut off the flow of air pressure. The pressure in the outlet chamber now reduces as some of the air flows into the tire which is obviously of greater capacity than the outlet chamber 18. As the pressure in the tire and outlet chamber approach equalization, the piston on diaphragm 14 will assume a position of equilibrium. If the pressure in the tire however is less than that to which the spring 30 has been adjusted, the spring operating on disc 21 and diaphragm 15 will again depress the piston and initiate a second cycle of operation. It should be appreciated that the spring 49 is relatively light and that therefore the device will come to rest with check valve 51 closed when pressure in the tire is just below the actual pounds pressure exerted by spring 30.

This difference is valuable since it precludes overinflation in unknown degrees. The device however is made to inflate to exactly the number of pounds pressure desired by making an adjustment of the figures on indicator dial 63. It is worthy of note that the device operates with uniform rapidity throughout its series of cycles of operation, normally increasing the pressure in the tire or receiver about two pounds for each cycle of operation. It is also noteworthy that so long as there is even a slightly lesser pressure in the receiver than in the outlet chamber 18 after a given closing operation of the poppet valve, the device will quickly perform one or more cycles of operation.

It will be understood that structural modifications of the device may be made without departing from the present invention, for example the diaphragm 14 may be replaced with a cup piston leather and made to reciprocate in a perfectly smooth continuous bore in the inlet and outlet chambers 16 and 18. The various moving parts may have an allowance for finish within liberal limits so that they may be turned out on the ordinary screw machine at a low manufacturing cost.

What is claimed is:—

1. The combination with a source of continuous air pressure, of a casing having a chamber therein, a piston dividing said chamber into inlet and outlet chambers and having limited reciprocation therein, a valve opened by the piston and controlling air inlet flow into said inlet chamber, a valve in the piston controlling communication between inlet and outlet chambers and a pressure determining adjustment means initiating movement of the piston in a valve opening direction.

2. The combination with a source of fluid pressure supply, of a hollow casing, a movable member dividing the hollow casing into an inlet chamber and an outlet chamber, a valve carried by the movable member and controlling communication between said chambers, a normally closed inlet valve for admitting fluid under pressure from such supply source to the inlet chamber, a plunger cooperating with the movable member to effect opening of said inlet valve as the movable member is moved in one direction, a diaphragm, adjustable pressure means operative on the diaphragm to initiate valve opening movement of the movable member when pressure in the inlet chamber is below that in the outlet chamber, said diaphragm also serving to normally retain the communication control valve closed, and means to positively open said latter valve when the movable member is moved a predetermined distance under the influence of inlet chamber pressure.

3. A combination of a hollow casing, a piston dividing the casing into an inlet chamber and an outlet chamber, a normally closed valve for connecting the inlet chamber with a source of air pressure supply, a valve carried by the piston and controlling communication between the chambers, means operable by the piston for opening the pressure supply valve, means effective for opening the communication control valve upon predetermined movement of the piston, yieldable means urging the piston against valve opening movement, and an adjustable pressure regulating means serving as an abutment for closing the communication control valve and for initiating valve opening movement of the piston when the pressure in the outlet chamber is less than that in the inlet chamber with the supply valve closed.

4. In combination a hollow casing having a movable member dividing it into an inlet chamber and an outlet chamber, valve means in the movable member to control communication between said inlet chamber and said outlet chamber, a pressure inlet valve opened by the movable member to allow pressure to enter said inlet chamber and a pressure setting device comprising a flexible diaphragm forming a head for the inlet chamber and means normally exerting pressure on said diaphragm, said pressure setting means serving to normally seat the communication control valve means in said movable member and to initiate movement of the movable member to cause said pressure inlet valve to open.

5. An air pressure regulator comprising a combination of a hollow casing, a hollow piston dividing the casing into an inlet chamber and an outlet chamber, a valve in the piston controlling communication between said chambers, a pressure supply valve opening by movement of the piston in one direction to admit pressure to said inlet chamber, means to open the valve in the piston on predetermined movement of the piston in one direction, and an adjustable yielding abutment for closing the valve in the piston and initiating supply valve opening movement of the piston.

6. An air pressure regulator comprising a hollow body, a piston oscillatable therein, a valve in the piston, means positively seating and unseating the valve in the piston, a pressure supply valve for admitting pressure to said hollow body, said supply valve opening and closing upon movement of the piston in opposite directions, and yielding adjustable means for determining the normal position of the means for sealing the valve in the piston.

7. An air pressure regulator comprising a hollow body, a movable member therein dividing the body into a pressure inlet chamber and a pressure outlet chamber, a pressure inlet valve for admitting pressure to said inlet chamber, said inlet valve being movable to open position by movement of the movable member in one direction, a communication valve mounted on the movable member yieldingly urged to open position and controlling communication between the chambers, means yieldingly urging the movable member against inlet valve opening movement, and a pressure setting means including a diaphragm serving as an abutment against which the communication valve closes and serving to initiate inlet valve opening movement of the movable member when the pressure in the outlet chamber falls below setting pressure.

8. In an air pressure regulator, the combination of a hollow casing having a piston member reciprocable therein a poppet valve in the piston, said piston dividing the casing into an inlet chamber and an outlet chamber, a normally closed pressure inlet valve, means operable by the piston for opening the pressure inlet valve, means yieldingly urging the piston against inlet valve opening movement, means yieldingly urging the poppet valve to open position, means for positively opening the poppet valve upon predetermined movement of the piston in inlet valve opening direction, and an adjustable pressure setting means adapted to initiate pressure valve opening movement of the piston.

9. In a device of the class described the combination of a casing having an inlet chamber and outlet chamber, a hollow movable member reciprocable therebetween, a valve on the inlet chamber end of the movable member for controlling communication between the chambers, means yieldingly urging the movable member toward the inlet chamber, a pressure inlet valve discharging into the inlet chamber, means opening said valve when the movable member is moved against the yielding means, and means subjected on opposite sides to adjustable setting pressure and the pressure in the inlet chamber for initiating pressure inlet valve opening movement of the movable member, for initially retaining the communication control valve closed and for receding under increased inlet chamber pressure to permit opening of the control valve whereby inlet chamber pressure may be discharged to the outlet chamber to charge a receiver connected thereto, the movable member effecting continued reciprocating movement and its associated valve effecting intermittent opening and closing until such receiver attains a pressure equal to the setting pressure.

10. In combination a casing, a fluid pressure operated piston therein, a pressure inlet valve opened by movement of the piston in one direction, a poppet valve on the piston, means positively unseating the poppet valve upon continued movement of the piston in the said direction and yielding means urging the piston in the opposite direction when fluid pressure is equalized on opposite sides of the piston.

11. In combination a casing having a cylindrical bore, a piston reciprocable in said bore and providing an inlet chamber and an outlet chamber communicating through the piston, a valve on the piston controlling communication between said chambers, means yieldingly urging the piston valve to open position, means positively opening said piston valve upon predetermined movement of the piston in one direction, means yieldingly resisting movement of the piston in said direction, a pressure inlet valve opened by movement of said piston in said direction, whereby pressure in the inlet chamber is increased to move the piston against the yielding resistance, and an adjustable pressure setting means effecting initial movement of the piston against said yielding resistance to effect pressure valve opening when the outlet chamber pressure and the pressure of the yielding resistance combined are less than inlet chamber pressure.

12. In combination a three part casing each of the parts having aligned bores therein, diaphragm members secured between each of the adjacent casing members, means securing the casing parts together and securing the diaphragms, a piston member disposed in the aligned bores in the casing and fixing to one of said diaphragms, said piston having a tapered wall portion, a plunger operated valve, a plunger having a face cooperating with the taper on the piston for opening the valve upon movement of the piston, the piston having a central bore therethrough, a communication valve at the end of said piston adjacent the second diaphragm, means controlling opening and closing of the communication valve, and an adjustable spring pressure means operative in the direction of closing of the communication valve.

13. In combination a casing having a bore therein, a piston member reciprocable in said bore, a diaphragm secured transversely of the said bore and having the piston secured thereto, a second diaphragm secured transversely adjacent an end of the piston and movable relative thereto, means for exerting predetermined pressure on said last mentioned diaphragm, a valve on the piston controlling communication through the piston and normally closed under the predetermined pressure of said last mentioned diaphragm, a pressure inlet valve, means to open one of said valves upon movement of the piston in the direction of diaphragm pressure thereon.

14. In an air pressure regulator the combination of a casing having a chamber therein provided with inlet and outlet ports, a diaphragm in the chamber, a piston member supported by the diaphragm and having an inclined wall, a valve having an operating member coacting with the inclined wall of the piston whereby the valve opens and closes as the piston reciprocates, and cooperating means on side of the diaphragm adjacent said inlet valve for initiating valve opening movement of the piston member and for controlling flow through the piston.

In testimony whereof, we have hereunto subscribed our names this 12th day of June, 1929.

GEORGE KOEHLER, JR.
WALTER P. HILL.